T

(12) United States Patent
Mueller et al.

(10) Patent No.: US 8,011,619 B2
(45) Date of Patent: Sep. 6, 2011

(54) INSULATION PACKAGE ARRANGEMENT FOR INSULATING THE INTERIOR OF AN AIRCRAFT FUSELAGE

(75) Inventors: Rainer Mueller, Rosengarten (DE); Peter Turanski, Suestedt (DE); Wilko Oestereich, Bremen (DE); Thorsten Reinelt, Stuhr (DE)

(73) Assignee: Airbus Deutschland GmbH, Hamburg (DE)

( * ) Notice: Subject to any disclaimer, the term of this patent is extended or adjusted under 35 U.S.C. 154(b) by 254 days.

(21) Appl. No.: 10/596,982
(22) PCT Filed: Jan. 5, 2005
(86) PCT No.: PCT/EP2005/000044
§ 371 (c)(1), (2), (4) Date: Sep. 1, 2006
(87) PCT Pub. No.: WO2005/068290
PCT Pub. Date: Jul. 28, 2005

(65) Prior Publication Data
US 2006/0284014 A1 Dec. 21, 2006

Related U.S. Application Data

(60) Provisional application No. 60/600,106, filed on Aug. 9, 2004.

(30) Foreign Application Priority Data

Jan. 5, 2004 (DE) .................. 10 2004 001 049

(51) Int. Cl.
*B64C 1/40* (2006.01)
(52) U.S. Cl. ............ 244/121; 244/129.2; 244/131
(58) Field of Classification Search ............ 24/297, 24/453, 114.3, 581.1, 16 PB, 102 T; 52/404.2, 52/407.4, 404.4, 512, DIG. 6; 411/455, 508, 411/509, 510, 487, 383, 439, 903, 512, 913; 244/121, 171.7, 119, 1 R, 1 N, 117 A, 117 R, 244/159.1, 129.2, 131
See application file for complete search history.

(56) References Cited

U.S. PATENT DOCUMENTS 2,342,839 A 2/1944 Byers
(Continued)

FOREIGN PATENT DOCUMENTS

DE 3111596 A1 10/1982
(Continued)

OTHER PUBLICATIONS

Informational Material on Burnthrough Test, Jun. 2003, International Aircraft Materials Fire Test Working Group Meeting of Jun. 23-24, 2003. Accessed cached internet archival dated Dec. 17, 2003 online on Jan. 27, 2010 at: http://web.archive.org/web/20031217003829/http://www.fire.tc.faa.gov/ppt/materials/PresentationBTAC.ppt.*

(Continued)

*Primary Examiner* — Tien Dinh
*Assistant Examiner* — Richard R Green
(74) *Attorney, Agent, or Firm* — Christopher Paradies; Fowler White Boggs P.A.

(57) ABSTRACT

The design and attachment of an insulation package near the fuselage structure to protect the cabin region of an aircraft against fire acting on the insulation package from outside the aircraft environment, thus clearly facilitating evacuation of the passengers from the vehicle. The insulation package arrangement may comprise several fuselage insulation packages of an elongated form. These packages may adjoin the aircraft fuselage structure in the direction of the longitudinal axis of the aircraft. They may be completely enclosed by a burn-through-proof foil which is arranged in a space enclosed by interior paneling and by the panels of the outer skin. The longitudinal end of the fuselage insulation package continues outward with a flat insulation end section is attached which is attached to a rib-attachment region arranged below the respective longitudinal sides of a rib and near the stringer by means of burn-through-proof attachment elements arranged on the inside of the aircraft with respect to the insulation.

21 Claims, 5 Drawing Sheets

U.S. PATENT DOCUMENTS

| | | | |
|---|---|---|---|
| 3,003,902 A | | 10/1961 | McDuff |
| 3,567,162 A | * | 3/1971 | Lea ............................... 244/121 |
| 4,598,007 A | | 7/1986 | Kourtides et al. |
| 4,805,366 A | * | 2/1989 | Long ........................ 52/309.11 |
| 4,842,465 A | | 6/1989 | Pease et al. ................... 411/337 |
| 4,907,923 A | * | 3/1990 | McGrath, Jr. ................. 411/107 |
| 5,298,694 A | | 3/1994 | Thompson et al. |
| 5,759,659 A | | 6/1998 | Sanocki et al. |
| 5,866,231 A | * | 2/1999 | Bodin et al. .................. 428/131 |
| 5,987,833 A | | 11/1999 | Heffelfinger et al. |
| 6,000,107 A | * | 12/1999 | West ............................... 24/453 |
| 6,122,387 A | * | 9/2000 | Borchers et al. ............. 381/190 |
| 6,177,157 B1 | | 1/2001 | Cota |
| 6,231,944 B1 | | 5/2001 | Holt |
| 6,314,630 B1 | * | 11/2001 | Munk et al. ................. 29/407.01 |
| 6,358,591 B1 | * | 3/2002 | Smith ............................. 428/74 |
| 6,442,806 B1 | * | 9/2002 | Wesson ...................... 24/573.11 |
| 6,627,561 B1 | | 9/2003 | Wulliman et al. |
| 6,777,103 B2 | * | 8/2004 | Merkley et al. ............... 428/532 |
| 7,083,147 B2 | | 8/2006 | Movsesian et al. |
| 7,186,360 B2 | | 3/2007 | Benitsch |
| 7,282,252 B2 | | 10/2007 | Fay et al. |
| 2005/0211839 A1 | | 9/2005 | Movsesian et al. |

FOREIGN PATENT DOCUMENTS

| | | |
|---|---|---|
| DE | 19832000 C1 | 11/1999 |
| EP | 0320377 A1 | 6/1989 |
| EP | 1134479 A2 * | 9/2001 |
| EP | 1164006 A1 * | 12/2001 |
| WO | WO 9112131 A * | 8/1991 |
| WO | 00/75012 A1 | 12/2000 |
| WO | 0075012 A1 | 12/2000 |

OTHER PUBLICATIONS

Fire Safety Branch—AAR 440. Accessed cached internet archival dated Aug. 7, 2003 online on Jan. 27, 2010 at: http://web.archive.org/web/20030807165324/www.fire.tc.faa.gov.*

Minutes of the International Aircraft Materials Fire Test Working Group Meeting held on Jun. 23-24. Accessed online on Jan. 27, 2010 at: http://www.fire.tc.faa.gov/pdf/materials/MaterialsJun03Min.pdf.*

14 CFR Parts 25, 91, et al. Improved Flammibility Standards for Thermal/Acoustic Insulation Materials Used in Transport Category Airplanes; Final Rule, Jul. 31, 2003. Federal Register vol. 68, No. 147, pp. 45046-45084.* www.wikipedia.com, Definition of "Paraboloid", retrieved from website Sep. 12, 2008, p. 1-3.

* cited by examiner

INSULATION PACKAGE ARRANGEMENT FOR INSULATING THE INTERIOR OF AN AIRCRAFT FUSELAGE

CROSS REFERENCE TO RELATED APPLICATIONS

The present application claims priority of DE 10 2004 001 049 filed Jan. 5, 2004 and U.S. 60/600,106 filed Aug. 9, 2004, which are both hereby incorporated by reference.

FIELD OF THE INVENTION

The field relates to an insulation for an aircraft such as a fire insulation or protection. In particular, the field relates to an insulation package arrangement for insulating the interior of an aircraft fuselage.

BACKGROUND OF THE INVENTION

Figure 1:
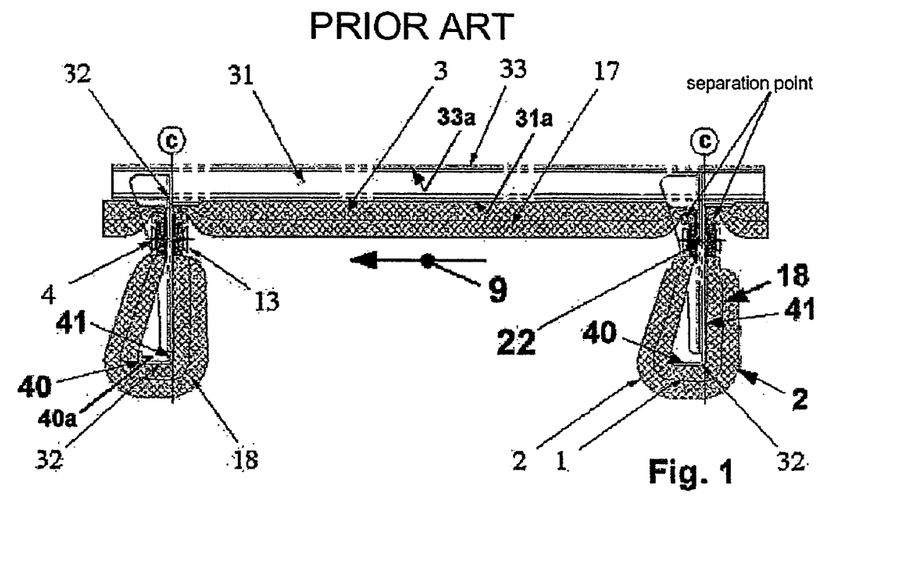
FIG. 1 shows conventional fuselage insulation in a commercial plane.

Conventional insulation systems are known which, as shown in the enclosed FIG. 1, essentially comprise a core- and insulation material which is embedded in an insulation package and comprise an enclosure. The core- and insulation material may comprise products of the fiber industry, of which products in particular glass fiber materials (glass wool) are in widespread use. This material meets to a very large extent the requirements regarding thermal and acoustic insulation. In order to install (attach) the relatively amorphous semi-finished products to (or near) the vehicles structure, the insulation package (which is made from these semi-finished products) is enclosed in an enclosing foil. The ends of this enclosing foil may be reinforced so that adequate attachment of the (thus completed) insulation package to the structural surfaces of the vehicle may take place by means of attachment elements.

In aircraft engineering, attachment of insulation packages takes place on the ribs of the fuselage structure, wherein attachment elements are used which usually comprise a plastic material, for example, a polyamide.

Figure 2:
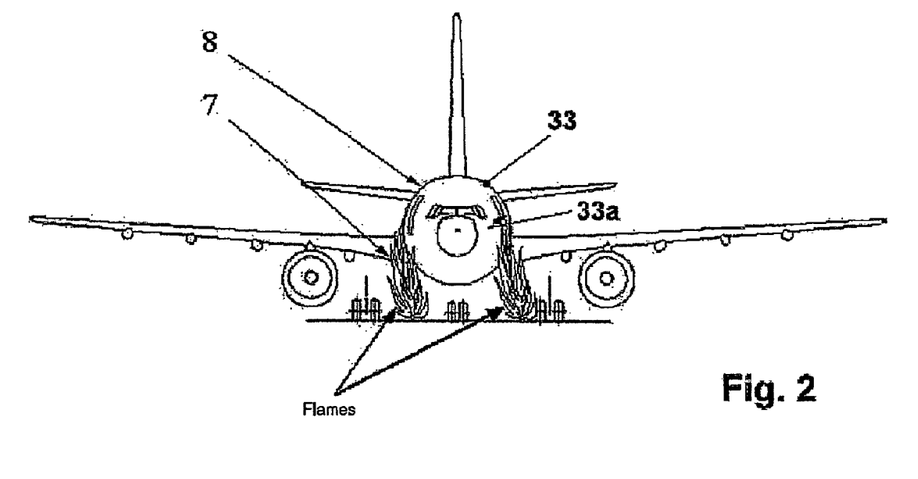
FIG. 2 shows a (so-called) post-crash fire scenario relating to an aircraft about to park.

FIG. 2, shows a so-called post-crash fire scenario of an aircraft where burning kerosene can cause the aluminum cell of the aircraft structure and also the fuselage insulation (interior insulation) of the aircraft to burn through. Through such holes, a flashback of the fire into the passenger cabin may occur. Thus, there is always a desire to provide for an even better fire insulation or protection for aircraft fuselages which may withstand such fire situations for an extended period of time.

Furthermore, conventional insulation attachment elements are made from non-metal materials (plastics), which in the case of a fire may melt. Thus, there is always a desire to extend a period of time the attachment elements resist a fire and hold the insulation in place to prevent falling down of the (burning) insulation (insulation packages), which may lead to the presence of uncontrollable obstacles in the vehicle's interior.

In addition to this, WO 00/75012 A1 discloses an aircraft fuselage insulation which is stated to be "fire-resistant". This printed publication discloses an insulation package which, is arranged as primary insulation within a space situated between the interior paneling of the fuselage and the outer skin of the fuselage. In this arrangement, the insulation package is protected in regions by a foil made of a fire-blocking material, wherein this foil region which acts in a fire-blocking way directly faces the outer skin of the fuselage (in the manner of a protective shield against fire).

SUMMARY OF THE INVENTION

According to an exemplary embodiment of the present invention, an insulation package suitable for arrangement in a space between an interior paneling of an aircraft cabin and an outer skin of the aircraft, and a respective arrangement are provided, comprising a first insulation package of a first type and a second insulation package of a second type. According to an aspect of the present invention, the first insulation package of the first type and the second insulation package of the second type are combined to a third insulation package of a third type.

It is believed that due to the combination of the first and second insulation packages, an amount of section points between the first and second insulation packages may be reduced which may allow for an improved insulation since these section points or section lines often represent weak points of the insulation.

E.g., the first insulation package of the first type may be a insulation package for a rib or frame region of the fuselage whereas the second insulation package of the second type may be an insulation package for a field region of the fuselage. The types of the insulation packages may differ by dimensions such as thickness, size, by the material of the insulation package or by a foil and/or the material or layering of the foil which at least partially may envelope the insulation packages.

Furthermore, burn-through-proof attachment elements may be used for arranging and/or attaching the third insulation package to structures of the vehicle, such as frames, ribs or stringers of the fuselage. Such burn-through-proof attachment elements may comprise metal, but may also be made of fire resistant material such as a plastic having a high melting point. Also, the insulation packages may be arranged such that the packages themselves also protect the attachment element from the exposure to the fire. This may e.g. realized by arranging the insulation package such that it forms a cushion around the attachment element or forms a kind of fire shield.

It is believed that an improved insulation package arrangement for an aircraft may be provided, which arrangement may be used for interior insulation, to such an extent that with it the flames of a seat of fire acting from outside the aircraft environment are substantially prevented from entering the cabin space of an aircraft (that has made an emergency landing) or a fire withstanding time may be extended. The design of the insulation package and its attachment to the fuselage structure is believed to be suitable for implementing an increase in the fire protection safety of separated interior regions that are situated near a structural outer skin.

An insulation package arrangement according to an exemplary embodiment of the present invention may prevent the spread of flames acting from outside the aircraft environment, of a source of fire, from entering the cabin space of the aircraft, wherein the design and attachment of an insulation package on the fuselage structure is implemented in such a way that the cabin region of the aircraft is protected against fire spreading from outside the aircraft environment. Furthermore, it is believed that evacuation of the passengers from the vehicle is clearly facilitated e.g. due to the fact that the time required until the fasteners give up may be extended.

BRIEF DESCRIPTION OF DRAWINGS

An exemplary embodiment of the invention is described in more detail with reference to the following drawings.

DETAILED DESCRIPTION OF EXEMPLARY EMBODIMENTS

For greater ease of understanding FIG. 1, which shows an insulation, it should be mentioned by way of an introduction that the structural unit of the aircraft fuselage not only comprises stringers 31 with which all the panels of an outer skin 33 of an aircraft fuselage structure are stiffened, but also comprises several ribs 32 which are arranged substantially perpendicularly to the longitudinal axis 9 of the aircraft (approximately) at a distance c, and are attached to the stringer 31. Integrated in these ribs 32, on the unattached end is a (so-called) rib carrier 40 which continues on substantially parallel to the longitudinal axis 9 of the aircraft, wherein the (unattached free) end of the rib carrier 40 (according to this embodiment) is angled substantially perpendicularly to the longitudinal axis 9 of the aircraft.

Figure 3:
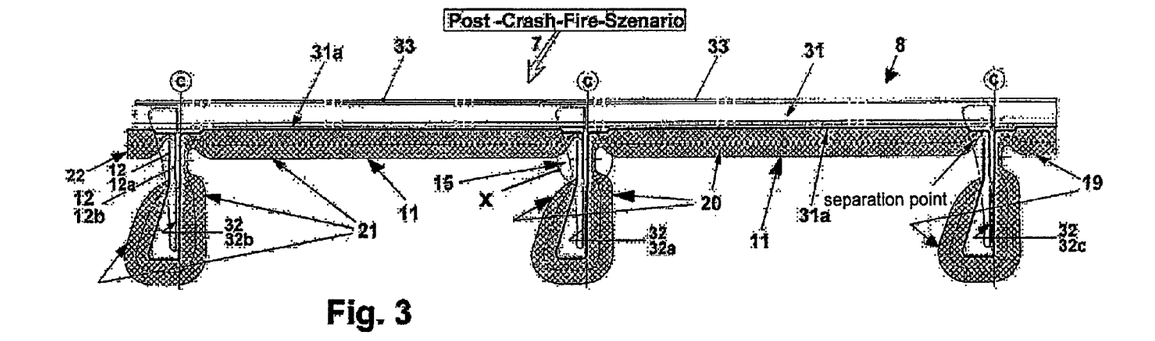
FIG. 3 shows an insulation package arrangement for insulating the interior of an aircraft fuselage with a burn-through-proof foil enclosure of the insulation package according to an exemplary embodiment of the present invention.

FIG. 1 shows the position of an insulation package 3 (with general reference characters) (of the fuselage insulation) on the (near) outer skin 33 of the aircraft. In each instance, this insulation package 3 comprises a so-called field insulation package 17 and a so-called rib insulation package 16, which in the traditional way are both installed separately and are attached near the outer skin 33 or are attached so as to rest against a stringer support surface 31a of the stringer 31 (i.e., in a defined structural zone of the aircraft fuselage structure). FIG. 1 thus shows that a field insulation package 17 has been placed between the (two) ribs 32, spaced apart at a distance c, near (resting against) an inner area of a panel of the outer skin of the outer skin 33. Furthermore, a rib insulation package 18 has been placed onto the rib carrier 40, wherein said rib insulation package 18 is guided so as to be resting on both sides against the longitudinal sides 41 of the ribs. When viewed from the side as shown in FIG. 3, the rib insulation package 18 is guided not only on the so-called front longitudinal side 41 (the right-hand side) of the rib but also on the so-called rear longitudinal side 41 (the left-hand side) of the rib.

These two insulation packages are completely enclosed by a combustible plastic foil. They are arranged within a space (not shown in FIG. 1) delimited by interior cladding of the aircraft and the panels of the outer skin 33.

The insulation arrangement according to an exemplary embodiment of the present invention may be arranged in spaces, e.g. in spaces to be partitioned off, which spaces include a space enclosed by the outer skin 33 and by interior cladding of the aircraft cabin, said space being arranged substantially parallel at a defined distance (transversely to the longitudinal axis of the fuselage 9).

With reference to FIG. 2, "a fire situation" involving an aircraft after an emergency landing will be described. If, in the context of such a (hypothetical) fire situation, referred to as a "post-crash fire scenario" 7, one considers that an emergency situation for passengers and the aircrew will arise in the fuselage, i.e. in the interior of the cabin in the case of an aircraft structure 8 (damaged from the outside) (with a defective outer skin 33) following external mechanical action and a resulting fire acting on the shown aircraft regions due to spillage and ignition of kerosene, then it may be understood that a period of time during which the structure, the fuselage and also the paneling withstands the fire should be extended and as long as possible to allow a coordinated evacuation, for example.

Below, respective improvements and exemplary embodiments are proposed with which that an improved protection may be provided. It will, among others, be referred to FIG. 3 and subsequently FIGS. 4, 4a, 5, 5a and 6.

In order to implement this aspect, which intends to provide better fire protection safety for separated interior space regions (cabin regions), for example of a passenger aircraft, which interior space regions are situated near the outer skin 33 of the aircraft, it should be mentioned at this point that a burn-through-proof foil 11 made of a fireproof foil material is proposed which according to the embodiment shown in FIG. 3 completely encloses a fuselage insulation package 19 which is used for insulating the interior of an aircraft fuselage. A foil material which is only fire resistant or fire retarding may not be sufficient in all cases. It is believed that by providing a complete foil enclosure of the fuselage insulation package 19 on its own, it may not always be possible to counter the impending hazards in a (non-foreseeable and non-desired) case of a catastrophic fire involving an aircraft—for whatever reasons—in order to meet the threatening hazards of a catastrophic fire.

FIG. 3 shows an advanced fuselage insulation system. The arrangement of the fuselage insulation on the structure of an aircraft fuselage is shown, which arrangement comprises several fuselage insulation packages 19, 20, 21, 22 arranged in the direction of the longitudinal axis 9 of the aircraft, wherein the packages are of an elongated shape.

An individual fuselage-insulation package 19 to 22 comprises a combined field insulation package and rib insulation package 17, 18 (presented with regard to FIG. 1), in each instance relating to a fuselage insulation package 19 to 22 whose arrangement on the structure of the aircraft fuselage to the largest extent possible agrees with the position of the individual field- and rib insulation package 17, 18 according to FIG. 1. As a result of this combination, the frequency of the joints (interruptions) (shown in FIG. 1) in the fuselage insulation is minimized or reduced (in comparison with the traditional installation of such insulation packages 3), at least halved, which, from the point of view of fire protection safety, in the region of the attachment points of the fuselage insulation presents fewer weak points to the fire.

In contrast to the field- and rib insulation packages 17, 18 where only relatively amorphous semi-finished products, such as, glass fiber materials, are used which meet the requirements of thermal and acoustic insulation, which insulation is enclosed by a combustible plastic foil, the design of individually proposed fuselage insulation packages 19 to 22 takes into account a burn-through proof insulation of a larger cross section, or a burn-through-proof barrier layer of a smaller cross section, or both burn-through-proof insulation means, which are thus arranged either individually (each on its own) or together in combination within the respective fuselage insulation package 19 to 22.

In this arrangement one of the two burn-through-proof insulation means is situated either close to or resting against an interior wall region of the foil wall (of the foil 11).

As an alternative, it is imaginable for the burn-through-proof insulation or the barrier layer to be guided outside of and adjacent to the circumference of the foil 11 of the individual fuselage insulation package 19 to 22, which insulation or barrier layer is attached to a support area 31a of the stringer 31 and is attached to the circumference of the foil 11 by means of adhesive connections.

Figure 4:
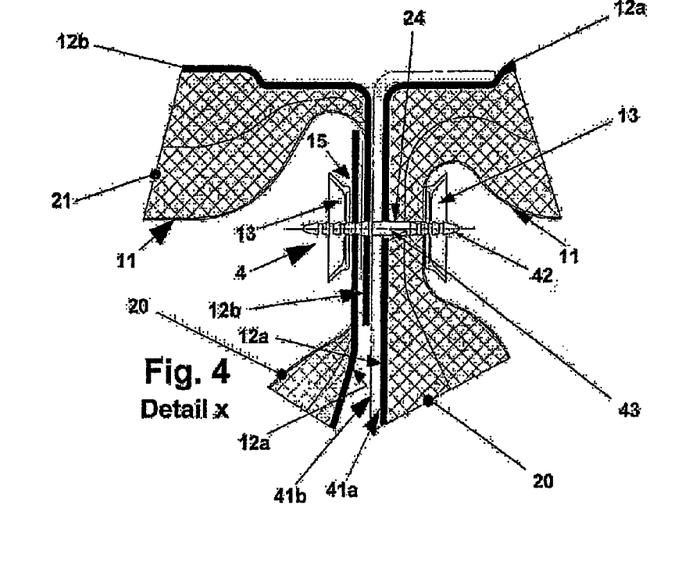
FIG. 4 detail "x" shown in FIG. 4, shows the attachment of the insulation end sections of two fuselage insulation packages on a rib according to an exemplary embodiment of the present invention.

FIG. 4, which will be explained in more detail later, shows a detail "x" which is shown in FIG. 3. Clearly shown is burn-through-proof insulation with a cross section which is larger than that of a barrier layer, wherein said insulation is arranged within the respective fuselage insulation package 19 to 22 and on the end of the foil 11 exits the latter as a flat insulation end section 12 (with the thickness of the burn-through-proof foil). The technology relating to sealing the foil end at the exit point of the insulation section 12 is not dealt with in detail.

This flat insulation end section 12, which continues, lengthwise outward, from the individual fuselage insulation package 19 to 22 which is elongated in shape, will be used for end-side attachment of the fuselage insulation packages 19 to 22 to the respective stringer 32a, 32b, 32c, wherein the attachment will be explained with reference to FIG. 4.

FIG. 3 also shows that for example a first fuselage insulation package 20 is arranged so as to rest against a support area 31a of the (respective) stringer 31 between a (thus numbered) third rib 32c and a first rib 32a, which are spaced apart by a specified distance c.

FIG. 3 further shows that the front and back of this first fuselage insulation package 20 are attached sideways in relation to (both) longitudinal sides 41a, 41b of the rib of a so-called first rib 32a, whose exiting insulation section 12 together with that of a second fuselage insulation package 21 (mentioned below) is attached to the first rib 32a (as shown in FIG. 4).

Likewise—using the same technology—the second fuselage insulation package 21 is arranged so as to rest against the support area 31a of the stringer 31 between the first rib 32a and a second rib 32b, which are spaced apart by said specified distance c, whose exiting insulation section 12 together with that of a fourth fuselage insulation package 22 (mentioned below and numbered accordingly) is attached to the second rib 32b (as shown in FIG. 4).

Additionally—using the technology described—a third fuselage insulation package 19 is arranged so as to rest against the support area 31a of the (respective) stringer 31 between the mentioned third rib 32c and a rib which is spaced apart from and arranged in front of the latter by the distance c, whose exiting insulation section 12 together with that of the first fuselage insulation package 2 is attached to the third rib 32c (as shown in FIG. 4). Furthermore, the placing of a fourth fuselage insulation package 22 is shown whose exiting insulation section 12 together with that of the second fuselage insulation package 21 is attached to the second rib 32b (as shown in FIG. 4).

For attachment, burn-through-proof attachment elements 4, 13 are used whose shape and design are shown in FIGS. 5, 5a, 6, 6a and whose arrangement (in conjunction with the image of the way the exiting insulation sections 12 are attached to the ribs 32a to 32c) is shown in FIG. 4.

In addition to the above explanations it should be mentioned that an embodiment which relates to placing of one of the fuselage insulation packages 19 to 22, which could rest against an inner area of a panel of the outer skin, is not examined in more detail although such a placement would theoretically also be imaginable. To this extent it is only mentioned that placement of the individual fuselage insulation packages below the intended stringer support area 31a and situated on the outer skin 33 will take place in a way similar to the placement in the installation explained above. If necessary, attachment could be on the given longitudinal sides 41a, 41b of an individual rib.

FIG. 4 shows the attachment of the first and second fuselage insulation package 20, 21 to the first rib 32a, wherein this embodiment of attachment, as has already been suggested, is technologically applied to the same extent on all ribs 32a, 32b, 32c (up to an nth rib) arranged in the direction of the longitudinal axis 9 of the aircraft, with two fuselage insulation packages 20, 21 which rest in series on the stringer support surface 31a, which rest on the rib-delimiting stringer support surface 31a. A prerequisite of this was that (in the context of previous work) a through hole 24 was drilled in the rib attachment region 15.

Furthermore, in a defined package region of the individual fuselage insulation package 19 to 22, which package region is provided for the rib to rest against the rear-(lateral right) positioned first longitudinal side 41a of the (in this instance) first rib 32a, a so-called hole-like leadthrough has been formed.

The package region arranged downstream of the respective fuselage insulation package 19 to 22 which (as shown in FIG. 1) rests against the rib carrier 40, and laterally resting against the angled-off end of the rib carrier 40, on the end of the foil end continues to a first flat insulation end section 12a of the (for example first) fuselage insulation package 20, which insulation end section 12a on the other side (lateral left) rests against a second longitudinal side 41b of the first rib 32a, which longitudinal side 41b is positioned on the front. Said first flat end section of insulation 12a comprises a so-called hole-like recess. Since it is intended for a second flat insulation end section 12b—which is continued on the end of the foil at the end of the adjacent (serially arranged) second fuselage insulation package 21—to be arranged on or below the support surface of the first insulation section 12a, that insulation end section 12b also comprises a so-called hole-like recess. If the hole-like leadthrough, the through hole and those two hole-like recesses are arranged so as to be congruent, an insulation pin, which is burn-through-proof, of the first attachment element may be fed through the holes of that defined package region of the first fuselage insulation package 20, through the through hole of the rib attachment region 15 and through the attachment region of the two flat insulation sections 12a, 12b.

Figure 5:
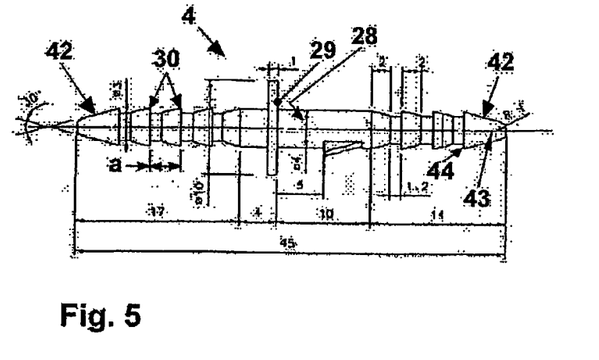
FIG. 5 shows a view of a first attachment element in the form of an insulation pin according to an exemplary embodiment of the present invention.
Figure 5A:
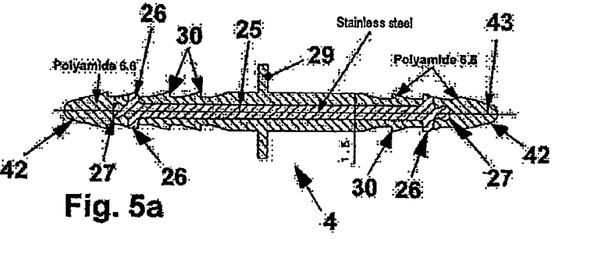
FIG. 5a shows a longitudinal section view of the insulation pin shown in FIG. 5.

According to FIGS. 5, 5*a*, the design of the insulation pin is implemented with a cylindrical core element 25 and a cylinder-like plastic-like casing 28, wherein the core element 25 near the end of the pin 27 in each case comprises a flange-like elevation 26. The core element 25, whose shape is shown in the longitudinal section view according to FIG. 5*a*, is embedded in that plastic-like casing 28. Approximately in the middle of the casing 28, a (type of ring-) flange 29 exits, from which, starting at the cylindrical circumference of the casing 28 and parallel to a pin axis 43 of the first attachment element 4 (of the insulation pin) distributed along its length—several pine-tree-shaped elevations 30 are positioned, which are arranged so as to be spaced apart from each other at a distance a. The pine-tree-shaped elevations 30 are comparable to a type of a stepped gradation 44 that is conical, wherein the gradation 44 starts at the circumference of the casing 28, wherein its tapering off conical form is realized by a conical tapering off of the circumference of the casing. The end region of the casing 28 is dome-shaped, in the form of a recess. The external shape of said end region is similar to that of a paraboloid, comparable to the shape of a parabolic rotation body whose longitudinal section has been realized with a parabolic shape, wherein the branch end of the parabola is continued by a stepped gradation 44 drawn inward vertically in relation to the pin axis 43. The core element 25 is made from metal, namely a steel, preferably stainless steel. In contrast to this, the casing is made from a plastic of poor thermal conductivity.

Figures 6, 6A:
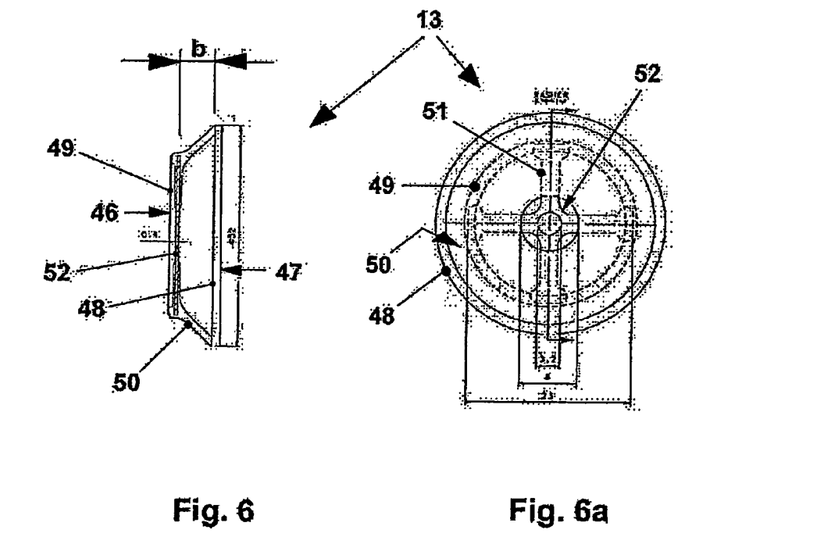
FIG. 6 shows a lateral view of a second attachment element in the form of a cage body in the form of a truncated cone according to an exemplary embodiment of the present invention.
FIG. 6a shows a top view of the cage body in the form of the truncated cone shown in FIG. 6 according to an exemplary embodiment of the present invention.

The design of the second attachment element 13 is implemented according to FIGS. 6, 6*a* with a so-called truncated-cone body in the form of a cage body in the shape of a truncated cone. The base area 46 and cover area 47 are implemented with insulation discs or ring elements 48, 49 which are designed so as to be burn-through proof. At the external circumference of these insulation discs or ring elements 48, 49 there is an insulation jacket 50, designed to be burn-through proof, which on the rim side is mechanically connected to the element of the base area 46 and to the element of the cover area 47.

The truncated-cone body could be designed such that the cover area 47 comprises a first insulation disc 48, where a hole has been made in the middle of the disc. The diameter of this hole should be smaller than the external diameter of the end region 42, in the shape of a paraboloid, of the dome-shaped casing 28, so that the holed wall of this insulation disc made from a plastic material may be guided with a tight fit over the branch end of the parabola of the parabolic end region 42 of the casing 28. Without pre-empting the further explanations, it is intended that the first insulation disc 48, made from a plastic material, due to the admitted flexibility of the plastic material may be moved over the dome-shaped casing 28 of the first attachment element 4 of the insulation pin (with a tight fit), whereas in the opposite direction of movement, this insulation disc may only be guided over the dome-shaped casing 28 with considerable mechanical effort. Since this embodiment will also take into account a second insulation disc 49 made of a plastic material, which disc forms the base area 46 of the truncated-cone body, in which in the middle of the disc there is a hole, the diameter of this hole is the same as, or slightly larger than, the external diameter of the dome-shaped casing 28 of the first attachment element 4 of the insulation pin, so that the second insulation disc 49 can be fitted over that dome-shaped casing 28 of the insulation pin. Returning to the illustrations in FIGS. 3 and 4, it thus becomes clear that in the final analysis a second attachment element 13, designed in such a way, of the flat insulation end sections 12, 12*a*, 12*b* to be fixed and attached to the longitudinal sides 41, 41*a*, 41*b* of the ribs 32, 32*a*, 32*b*, 32*c* is likely to be suitable.

As an alternative a second attachment element 18, designed as a truncated-cone body, comprising a first plastic-like insulation ring 48 of a larger circumference and a second plastic-like insulation ring 49 of a smaller circumference, is implemented. In this design, the circumference of the first insulation ring 48 edges the cover area 47 of the truncated-cone body of said second attachment element 13, whereas the circumference of the second insulation ring 49 edges the base area 46 of the truncated-cone body of said second attachment element 13. It is imaginable that on the interior ring diameter of the first and the second insulation ring 48, 49, several insulation braces 51, spaced apart on the circumference, are attached in vertical position. However, it may be sufficient if these insulation braces only the circumference of the second insulation ring 49 with the external circumference of a disc-shaped core element 52, wherein the external diameter of the core element 52 may be (significantly) smaller than the interior ring diameter of the second insulation ring 49. The core element 52 and the second insulation ring 49 are situated flat in the same plane, wherein the core element 52 comprises a hole in the centre of the disc and is embedded in a plastic-like casing.

It should be noted that the hole diameter of the second insulation ring 49 may be smaller than the external diameter of the end region 42, implemented in the shape of a paraboloid, of the dome-shaped casing 28, namely for the reasons mentioned above in regard to the above embodiment of the hole of the first insulation disc 48. The disc-shaped cone element 52 is made from metal. It comprises a steel, preferably stainless steel.

The above-mentioned casing of the core element 52 is implemented using a plastic material of poor thermal conductivity.

For the sake of completeness, it should be mentioned that the insulation discs or ring elements 48, 49 from which the second attachment element 13 is constructed, are arranged so as to be substantially parallel in relation to each other, wherein the element which forms the base area 46, in other words the second insulation ring 49, is arranged at a ring distance b (height distance of the rings) from the element which forms the cover area 47, in other words the first insulation ring 48. The circumference of these elements is enclosed by that insulation jacket 50 which is attached to the outside circumference of the rings.

It should be added that the second attachment element 13 may also be compared to the shape of a cage body in the form of a so-called truncated-cone body, because several insulation braces 51, designed so as to be burn-through proof, may be joined on the margin of the base area 46 and cover area 47 of the second attachment element 13. In this arrangement, the insulation braces 51 which are distributed around the circumference are attached on the circumference of the second insulation ring 49 which has the larger circumference and to the first insulation ring 48, in which braces 51 support the two rings in a cage-like manner. As an alternative it would be imaginable that these insulation braces 51 are supported by a second insulation disc 49 (which forms the base area 46) and by a first insulation disc 48 (which forms the cover area 47), to which the ends of the insulation braces 51 are attached by the rim.

It should also be mentioned that several fuselage insulation packages 19 to 22, which are positioned in a region of the fuselage structure which is delimited by ribs 32, 32*a*, 32*b*, 32*c*, are arranged on the inner structure of the fuselage. In this arrangement it is envisaged that the hole-like recess of the flat insulation end sections 12, 12a, 12b of those (at least two) fuselage insulation packages 19 to 22 which on one longitudinal side 41, 41a, 41b of the rib 32, 32a, 32b, 32c continue in an insulation section are conveyed to the first attachment element 4, which is an insulation pin designed to be burn-through-proof. As a result of this, a so-called overlap of the insulation end sections 12, 12a, 12b is formed on the respective longitudinal sides 41, 41a, 41b, 41c of the respective ribs. The attachment of said insulation end sections 12, 12a, 12b on the longitudinal sides 41, 41a, 41b, 41c of the ribs to the first attachment element 4 (4) is secured with the second attachment element 13, which is an insulation disc or ring element 48, 49.

Figure 7:
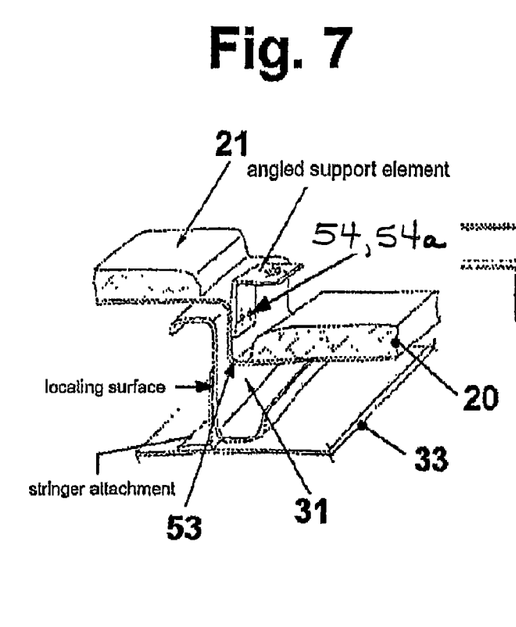
FIG. 7 shows a structure holder, attached to a stringer, comprising riveted attachment of the insulation sections of the fuselage insulation packages according to an exemplary embodiment of the present invention.

Finally, FIG. 7 shows a structure holder 53 which is joined to a stringer 31, attached to the outer skin 33 (and if need be) adjacent to the contact surface of the respective stringer attachment. However, this structure holder 53 can also be attached to the rib 32, 32a, 32b, 32c or to the unattached end of a rib 32, 32a, 32b, 32c at the (extended) rib head. This illustration shows that it is quite possible to attach those flat insulation end sections 12, 12a, 12b which extend a fuselage insulation package 19 to 22 between the support surfaces of the structure holder 53 and a support element (angled in the illustration shown) by riveting or screwing the element arrangement with a further burn-through-proof attachment element. That further attachment element is provided by a rivet connection element 54, comprising steel or titanium, or by a screw and nut connection element 54a, comprising steel or titanium or plastic. The screw and nut connection element 54a can comprise aramide or a CFK material.

Figure 7A:
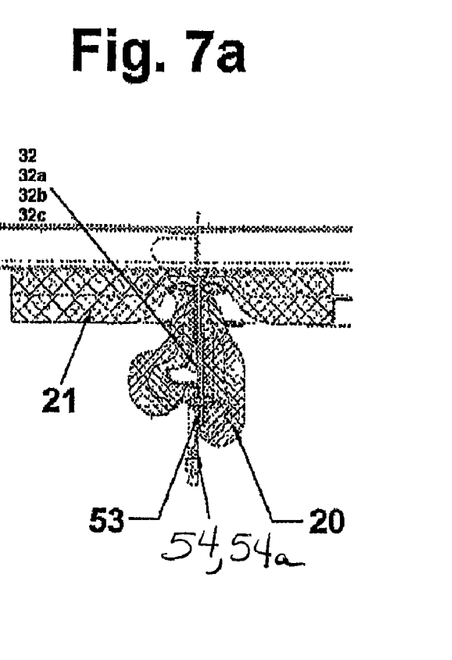
FIG. 7a shows the attachment of the insulation sections on a rib head with an extended rib according to an exemplary embodiment of the present invention.

FIG. 7a shows that rivet connection element 54 or that attachment of the insulation end sections 12, 12a, 12b on the rib-extended structure holder 53 which is attached to that rib head of the rib 32, 32a, 32b, 32c (which rib head is made without a rib carrier 40) by means of a screw connection element 54a on the rib-extended free end of the respective rib 32, 32a, 32b, 32c with said burn-through-proof connection element.

These measures according to FIGS. 7 and 7a ensure that in this arrangement in the area of system precautions which relate to the structure holder 53 riveted or screwed onto the structure, flashback of the flames of a fire (entering from outside the aircraft environment) is prevented. In this arrangement, this so-called "fire barrier" between these precautions and the aircraft structure is screwed or riveted.

In conclusion, it should be noted that the fuselage insulation package which is considered in relation to FIG. 1 is still an insulation package 3 traditionally made of glass fibers (glass wool). In this arrangement the core material of said insulation package 3 only meets the requirements of thermal and acoustic insulation.

(Here too) these are mostly products of the fiber industry, wherein predominantly glass fiber materials are used. Due to a (clearly) existing fire hazard for a passenger (or passengers) and aircrew as a result of this conventionally used design of the insulation package 3, in future improvements of said insulation package 3 will be necessary. This will have become clear with reference to the example shown in FIG. 2.

In order to at least halfway meet fire protection safety as far as the overall arrangement of interior insulation of an aircraft fuselage is concerned, the fuselage insulation packages 19 to 22 (up to an nth package) mentioned in FIG. 3, the core material (the glass fibers) will be completely enclosed by the above-mentioned foil 11 which is designed to be burn-through proof. The foil 11, which is proposed for enclosing the respective fuselage insulation package 19 to 22, is implemented with the use of a material that is burn-through proof, in other words with a foil material which does not succumb to fire coming through due to the extended effect of the flames of a fire 7 (shown in FIG. 2) acting on the outside surface of the foil 11, or on the foil material. This foil material will be an absolute barrier to a flaming fire to which a surface area of this foil 11 is exposed during a catastrophic fire which is e.g. shown in FIG. 2.

Since the term "burn-through proof" very much correlates to "fireproof", wherein "fireproof" is synonymous with "resistant to fire", the foil 11 will therefore comprise a material of significant long-term fireproofness, with said material having adequate fire resistance. The degree of resistance to fire 7 correlates to the type of foil material used and the thickness of the foil wall, wherein the duration of resistance correlates to a time span in which the foil 11 is used, which is regarded as a very long time span, which will last for a (finite) period starting with the commencement of the use of the foil 11, for example until a point in time at which the foil material for reasons of foil aging will lose its resistance to fire 7, or where it can be expected that such resistance to fire 7 will decrease.

The term "insensitive" describes a state of "not being sensitive" (in this instance) to the effect which exposure to flames of the fire 7 has on the foil material. Since other sensitivities of the foil material, for example to the environmental conditions which act on the foil material from outside the insulation package 3 at the location where the foil 11 is used, are imaginable, the statement "burn-through proof" will primarily include the statement "insensitive" to fire 7, wherein the foil material used is really also (and in aircraft engineering should also be) insensitive to other influences, for example to pollution and other chemical influences in the air, to the influence of electrical hazards, and to the influence of ambient barometric pressure etc.

Accordingly, the foils 11 should therefore be implemented with a material of very considerable and long lasting fireproofness, which material is resistant to and/or insensitive to fire 7 being encountered, for which reason there will be no burning through of a foil wall as a result of the influence of the flaming fire 7, even during extended influence on the foil surface area, and spreading of the fire 7 licking the foil surface area may be prevented.

REFERENCE CHARACTERS

1 Insulation material
2 Enclosing foil
3 Insulation package
4 First attachment element; insulation pin
7 Post-crash fire scenario; fire
8 Aircraft structure
9 Longitudinal axis of the aircraft
11 Burn-through-proof foil
12 Flat insulation end section
12a First insulation end section
12b Second insulation end section
13 Second attachment element, truncated-cone body
15 Rib attachment region
17 Field insulation package
18 Rib insulation package
19 Rib insulation package, third
20 Rib insulation package, first
21 Rib insulation package, second
22 Rib insulation package, fourth
24 Through hole; drill hole
25 Core element (of the first attachment element 4), cylindrical 26 Elevation (of the core element 25), flange-like
27 Pin end (of the core element 25)
28 Casing
29 Flange
30 Elevation, pine-tree-like
31 Stringer
31a Stringer support area
32 Rib
32a First rib
32b Second rib
32c Third rib
33 Outer skin
33a Inner area (of a panel of the outer skin 33)
40 Rib carrier
40a End (of the rib carrier 40)
41 Longitudinal side of the rib
41a First longitudinal side of the rib; rear (left), lateral
41b Second longitudinal side of the rib; front (right), lateral
42 End region
43 Pin axis (of the first attachment element 4)
44 Gradation
46 Base area (of the second attachment element 13)
47 Cover area (of the second attachment element 13)
48 First insulation ring
49 Second insulation ring
50 Insulation jacket
51 Insulation brace
52 Core element, disc-shaped
53 Structure holder
a Spacing (between the pine-tree-like elevations 30)
b Spacing (between the insulation rings 48, 49)
c Spacing (between the ribs 32, 32a, 32b, 32c)
32c Third rib
33 Outer skin
33a Inner area (of a panel of the outer skin 33)
40 Rib carrier
40a End (of the rib carrier 40)
41 Longitudinal side of the rib
41a First longitudinal side of the rib; rear (left), lateral
41b Second longitudinal side of the rib; front (right), lateral
42 End region
43 Pin axis (of the first attachment element 4)
44 Gradation
46 Base area (of the second attachment element 13)
47 Cover area (of the second attachment element 13)
48 First insulation ring
49 Second insulation ring
50 Insulation jacket
51 Insulation brace
52 Core element, disc-shaped
53 Structure holder
a Spacing (between the pine-tree-like elevations 30)
b Spacing (between the insulation rings 48, 49)
c Spacing (between the ribs 32, 32a, 32b, 32c)

The invention claimed is:

1. An insulation package system for insulating an interior of an aircraft, comprising:
   a fuselage, the fuselage including a plurality of stringers stiffening panels of an outer skin of the fuselage and a rib arranged substantially perpendicularly to a longitudinal direction along an axis of the fuselage of the aircraft, the rib being attached to one of the plurality of stringers at a first end of the rib and having a rib carrier integrated into the rib on an unattached end of the rib and a rib attachment region disposed between the first end and the rib carrier, the rib attachment region having a through-hole through the rib attachment region; and
   at least two fuselage insulation packages having an elongated package shape, and being situated in a direction of a longitudinal axis of the fuselage, each of the fuselage insulation packages comprising:
      a first flat insulation end section integrally extending outwardly from a first end of each of the at least two fuselage insulation packages and having a first length;
      a second flat insulation end section integrally extending outwardly from a second end of each of the at least two fuselage insulation packages opposite to the first end of each of the at least two fuselage insulation packages and having a second length shorter than the first length; and
      a foil enclosing a burn-through-proof insulation or a burn-through-proof barrier layer or both a burn-through-proof insulation having a first thickness and a burn-through-proof barrier layer having a second thickness less than the first thickness of the burn-through-proof insulation; and
   a burn-through-proof first attachment element having a first retainer end at one end of the first attachment element and a second retainer end at an opposite end of the first attachment element, the first attachment element being disposed through the through-hole of the rib attachment region such that the first retainer end is on one side of the rib attachment region and the second retainer end is on an opposite side of the rib attachment region,
   wherein the first retainer end of the first attachment element attaches both of the first flat insulation end section of a first of the at least two fuselage insulation packages and the second flat insulation end section of a second of the at least two fuselage insulation packages to one side of the rib attachment region of the rib via a hole in each of the first flat insulation end section of the first of the at last two fuselage insulation packages and the second flat insulation end section of the second of the at least two fuselage insulation packages such that a portion of the first of the at least two fuselage insulation packages overlaps with, or is overlapped by, the second of the at least two fuselage insulation packages, and the first of the at least two fuselage insulation packages is also retained on the opposite side of the rib attachment region by the second retainer end of the attachment element passing through a second hole formed in the first of the at least two fuselage insulation packages,
   wherein the first retainer end and the second retainer end are arranged on the inside of the aircraft with respect of the burn-through-proof insulation or the burn-through-proof barrier layer,
   the insulation package system further comprising:
      a second attachment element,
         wherein the second attachment element is shaped as a truncated-cone body and comprises an insulated disc element and the insulated disc element comprises a disc-shaped core element, defining a hole in the center of the disc and being embedded in a casing such that the insulated disc element is burn through proof.

2. The insulation package system of claim 1, wherein the disc-shaped core element of the second attachment element comprises a hole formed in the middle portion of the disc-shaped core element, the diameter of the hole of the disc-shaped core element being less than the external diameter of a dome-shaped casing of an end region of each of the first retainer end and the second retainer end of the first attachment element such that the second attachment element fits over the dome-shaped casing with a tight fit.

3. The insulation package arrangement of claim 1, wherein the casing is made of plastic and several insulation braces are spaced apart circumferentially and extend radially in a direction outwardly from the hole in the center of the disc-shaped core element.

4. The insulation package system of claim 1, wherein the disc-shaped core element is made from a metal, and the casing comprises a plastic material having a lower thermal conductivity than the metal of the disc-shaped core element.

5. The insulation package system of claim 1, further comprising an additional attachment element, wherein the additional attachment element is a rivet, comprising steel or titanium, or is a screw connection element comprising steel or titanium or plastic.

6. The insulation package system of claim 5, wherein the additional attachment element is a screw connection element and the screw connection element is retained by a nut made from an aramide or a carbon fiber reinforced plastic (CFK) material.

7. The insulation package system of claim 1, wherein the foil encloses both a burn-through-proof insulation having a first thickness and a burn-through-proof barrier layer having a second thickness less than the first thickness of the burn-through-proof insulation.

8. The insulation package system of claim 1, further comprising a third attachment element shaped as a truncated-cone body comprising an insulated disc or ring element and the insulated disc or ring element comprises a disc-shaped core element embedded in a casing such that the insulated disc or ring element is burn through proof wherein
the second attachment element of claim 1, is attached to the first retainer end, covering the hole in each of the first flat insulation end section of the first of the at last two fuselage insulation packages and the second flat insulation end section of the second of the at least two fuselage insulation packages, and the third attachment element is attached to the second retainer end, covering the second hole formed in the first of the at least two fuselage insulation packages on the opposite side of the rib attachment region.

9. The insulation package system of claim 8, wherein the first attachment element further comprises a burn-through-proof pin, the pin extending from the first retainer end to the second retainer end, the pin having a first retention flange protruding at one end of the pin and a second retention flange protruding at an opposite end of the pin.

10. The insulation package system of claim 9, wherein at least a portion of the pin is encased in a plastic casing.

11. The insulation package system of claim 10, wherein the plastic casing includes a central flange disposed between the first retainer end and the second retainer end, the central flange extending outwardly, in a radial direction from the pin.

12. The insulation package system of claim 11, wherein the plastic casing defines a three-dimensional shape having a plurality of pine-tree-shaped elevations on each of the first retainer end and the second retainer end for retaining the the second attachment element and the third attachment element.

13. The insulation package system of claim 12, wherein the second attachment element and the third attachment element are each comprised of the disc-shaped core element of a first burn-through-proof material and the casing is a shaped flange encasing at least a portion of the disc-shaped core element and extending from the disc-shaped core element, the shaped flange being of a second material, different than the first material.

14. The insulation package system of claim 13, wherein a surface of the shaped flange is formed in the shape of a paraboloid.

15. An insulation package arrangement for insulating an interior of a fuselage of an aircraft, the fuselage comprising a plurality of stringers for stiffening of an outer skin of the fuselage and at least two ribs having a portion arranged substantially perpendicularly to a longitudinal axis of the aircraft at a specified distance from one another, the at least two ribs being attached to one of the plurality of stringers, and the at least two ribs each comprise a rib carrier being integrated into said ribs at an unattached end of the at least two ribs, an attachment end attaching each of the at least two ribs to one of the plurality of stringers, and a rib attachment region in the portion arranged substantially perpendicularly to the longitudinal axis of the aircraft being arranged below a longitudinal side of each of the at least two ribs adjacent to the attachment region, the insulation package arrangement comprising:
at least two fuselage insulation packages having an elongated package shape, and being situated in a direction of a longitudinal axis of the fuselage, wherein each of the at least two fuselage insulation packages rest longitudinally against a support surface of one of the plurality of stringers;
wherein each of the at least two fuselage insulation packages are attached to the fuselage or are placed to rest against an inner area of a panel of the outer skin;
wherein each of the at least two fuselage insulation packages are arranged to be completely enclosed by a foil and within a space enclosed by interior paneling and by panels forming the outer skin of the fuselage;
a first burn-through-proof attachment element having a first retainer end at one end of the first attachment element and a second retainer end at an opposite end of the first attachment element, wherein each of the at least two fuselage insulation packages continue outward with a flat insulation end section on an end of the fuselage insulation package such that the at least two fuselage insulation packages are attached overlappingly with the burn-through-proof attachment element to one of the at least two ribs in the rib attachment region of the respective one of the at least two ribs; and
wherein a through hole is drilled through the rib attachment region, and a first hole is formed in a package region of a first one of the at least two fuselage insulation packages, and a second hole is formed in the flat insulation end section of the first one of the at least two fuselage insulation packages, and a third hole is formed in the flat insulation end section of a second one of the at least two fuselage insulation packages, and a fourth hole is formed in a package region of the second one of the at least two fuselage insulation packages, wherein the first hole and the second hole are retained on opposite sides of the rib attachment region by the burn-through-proof attachment element,
wherein the first retainer end and the second retainer end are arranged on the inside of the aircraft with respect of the burn-through-proof insulation or the burn-through-proof barrier layer,
the insulation package system further comprising
a second attachment element,
wherein the second attachment element is shaped as a truncated-cone body and comprises an insulated disc or ring element and the insulated disc element comprises a disc-shaped core element embedded in a casing such that the insulated disc element is burn through proof.

16. The insulation package arrangement of claim 15, wherein the first burn-through-proof attachment element comprises a burn-through-proof insulation pin, and the first burn-through-proof attachment element is fed through the first hole of the first one of the at least two insulation packages, the through hole of a respective one of the rib attachment regions of the at least two ribs, the third hole of the second one of the at least two insulation packages, and the second hole of the first one each of the at least two insulation packages, when arranged so as to be substantially congruently aligned with the through hole of the respective one of the rib attachment regions of the at least two ribs.

17. The insulation package arrangement of claim 16, wherein the insulation pin has an elongated cylindrical core element and a flange-like elevation formed at each end of the core element, and a casing formed around the core element.

18. The insulation package arrangement of claim 17, wherein the core element is embedded in the casing and wherein the casing is made of a plastic material.

19. The insulation package arrangement of claim 17, wherein a flange extends outwardly in a radial direction from a middle portion of the insulation pin, and a plurality of pine-tree-shaped elevations are formed in the casing along the surface of the casing along the length of the insulation pin, such that the ridges formed by the pine-tree-shaped elevations are spaced apart from each other.

20. The insulation package arrangement of claim 17, wherein the pin comprises an axis, wherein the end region of the casing is dome-shaped, wherein the external shape of said end region has the shape of a paraboloid, wherein the parabola comprises at least one branch end, and wherein the branch end is continued by a stepped gradation drawn inward radially in relation to the pin axis.

21. The insulation package arrangement of claim 17, wherein the core element is made from metal, and the casing comprises a plastic having a much lower thermal conductivity than the thermal conductivity of the metal of the core element.

* * * * *